(12) United States Patent
Takada et al.

(10) Patent No.: US 11,628,761 B1
(45) Date of Patent: Apr. 18, 2023

(54) HEADLIGHT AIMING MECHANISM AND OFF-ROAD VEHICLE INCLUDING THE SAME

(71) Applicant: KAWASAKI MOTORS, LTD., Hyogo (JP)

(72) Inventors: Kenta Takada, Akashi (JP); Ryo Sekoguchi, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 0 days.

(21) Appl. No.: 17/810,210

(22) Filed: Jun. 30, 2022

(51) Int. Cl.
*B60Q 1/068* (2006.01)
*B60Q 1/00* (2006.01)
*B60Q 1/072* (2006.01)

(52) U.S. Cl.
CPC ......... *B60Q 1/0683* (2013.01); *B60Q 1/0035* (2013.01); *B60Q 1/072* (2013.01)

(58) Field of Classification Search
CPC ..... B60Q 1/0683; B60Q 1/0035; B60Q 1/072
USPC ........................................................ 362/523
See application file for complete search history.

(56) References Cited

U.S. PATENT DOCUMENTS

| 4,787,665 | A | * | 11/1988 | Rich | B62D 35/00 296/180.1 |
| 6,443,605 | B1 | * | 9/2002 | Kasboske | F21V 21/005 362/543 |
| 6,447,152 | B1 | * | 9/2002 | Goebert | B60Q 1/0035 362/516 |
| 11,339,939 | B2 | * | 5/2022 | Evans | B60Q 1/076 |
| 11,480,854 | B2 | * | 10/2022 | Camras | H05B 47/125 |
| 2007/0127254 | A1 | * | 6/2007 | Chen | B60Q 1/0683 362/512 |
| 2017/0334343 | A1 | * | 11/2017 | Kastanis | B60Q 1/2665 |
| 2018/0037152 | A1 | * | 2/2018 | Wymore | B60Q 1/076 |
| 2021/0156536 | A1 | * | 5/2021 | Adams | G01J 1/0242 |
| 2021/0404619 | A1 | * | 12/2021 | Friesen | F21V 19/0055 |

FOREIGN PATENT DOCUMENTS

EP 3 290 269 A1 3/2018
JP 2018-034677 A 3/2018

* cited by examiner

*Primary Examiner* — Bryon T Gyllstrom
(74) *Attorney, Agent, or Firm* — Studebaker & Brackett PC (57) ABSTRACT

An aiming mechanism 10 includes a headlight 3, a supporter 4 that supports the headlight 3 on a vehicle body 1 such that the headlight 3 is rotatable about a predetermined rotation axis X, and an adjuster 6 that adjusts the rotation angle of the headlight 3 about the rotation axis X. The adjuster 6 is located accessible from above the vehicle body 1.

7 Claims, 6 Drawing Sheets

HEADLIGHT AIMING MECHANISM AND OFF-ROAD VEHICLE INCLUDING THE SAME

FIELD

The technique disclosed herein relates to a headlight aiming mechanism and an off-road vehicle including the aiming mechanism.

BACKGROUND

For example, Patent Document 1 (Japanese Unexamined Patent Application Publication No. 2018-034677) discloses an aiming mechanism that adjusts the optical axis of a headlight. The aiming mechanism has a screw attaching the headlight to a frame and a spring biasing the headlight. The inclination of the optical axis of the headlight is defined by interaction of the screw and the spring. The screw is accessible from the front of a vehicle body after a headlight cover has been detached from the vehicle body. An operator accesses the screw from the front of the vehicle body to adjust the degree of fastening of the screw, thereby adjusting inclination of the optical axis of the headlight.

SUMMARY

However, in the aiming mechanism of Patent Document 1, the screw is accessible from the front of the vehicle body, and for this reason, there is a probability that an adjuster such as the screw is visible from the front. A front surface of the vehicle body has great influence on an appearance, and the aiming mechanism might degrade a vehicle design. In a case where the adjuster is covered with, e.g., the headlight cover for improving the design, the headlight cover needs to be detached for optical axis adjustment, and for this reason, workability is degraded.

The technique disclosed herein has been made in view of the above-described points, and an object of the technique is to improve the workability in optical axis adjustment and ensure the vehicle design.

An aiming mechanism of the present disclosure includes a headlight, a supporter that supports the headlight on a vehicle body such that the headlight is rotatable about a predetermined rotation axis, and an adjuster that adjusts the rotation angle of the headlight about the rotation axis. The adjuster is located accessible from above the vehicle body.

An off-road vehicle of the present disclosure includes a vehicle body and the above-described aiming mechanism.

According to the aiming mechanism, the workability in optical axis adjustment can be improved, and the vehicle design can be ensured.

According to the off-road vehicle, the workability in optical axis adjustment can be improved, and the vehicle design can be ensured.

DESCRIPTION OF EMBODIMENTS

Figure 1:
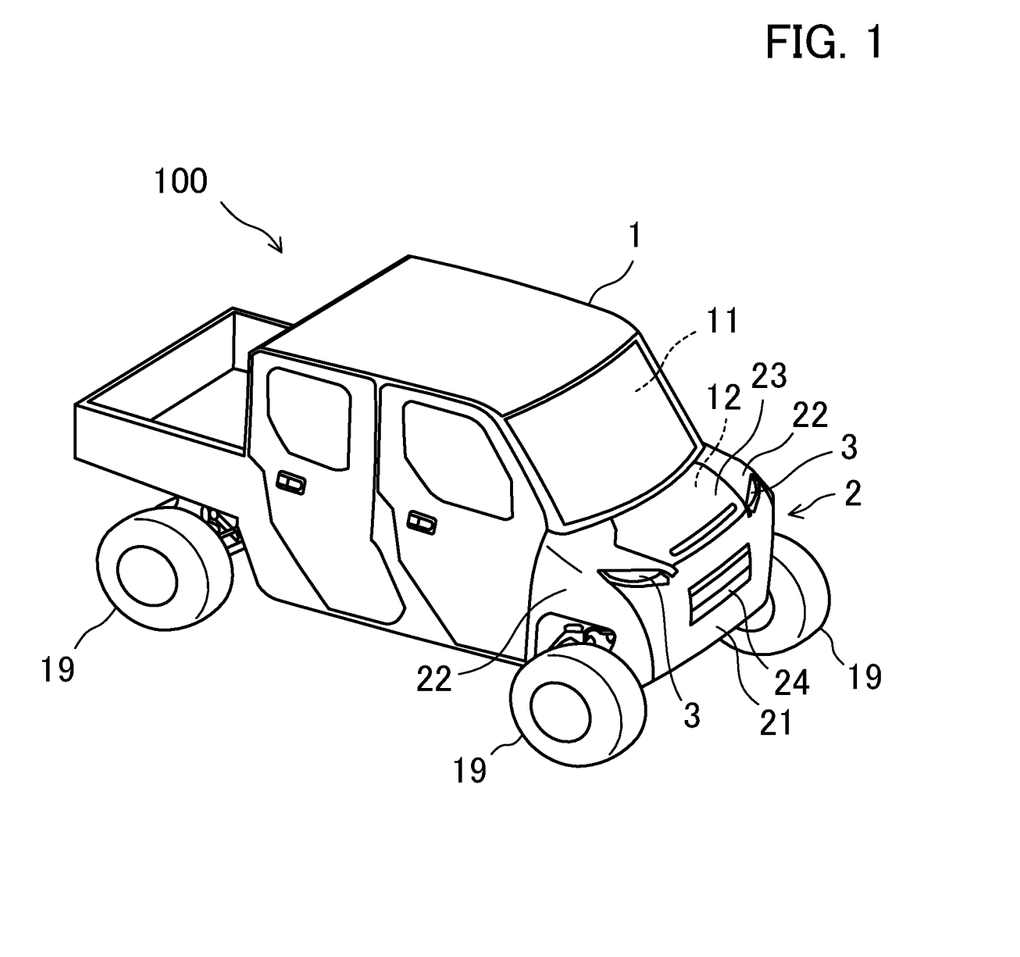
FIG. 1 is a perspective view of a utility vehicle.

Hereinafter, an exemplary embodiment will be described in detail based on the drawings. FIG. 1 is a perspective view of a utility vehicle 100.

The utility vehicle 100 includes a vehicle body 1 and four wheels 19. The four wheels 19 include two front wheels 19 and two rear wheels 19. A vehicle compartment 11 and a front room 12 are in the vehicle body 1. The front room 12 is a space located at the front of the vehicle compartment 11 and divided from the vehicle compartment 11. In this example, an engine is located at a rear portion in the vehicle body 1. Thus, in the front room 12, no engine is located, and a radiator etc. are located. The utility vehicle 100 is one example of an off-road vehicle.

Hereinafter, unless otherwise specified, upper and lower sides each mean upper and lower sides in a vehicle up-down direction. Front and rear sides each mean front and rear sides in a vehicle front-rear direction. Right and left sides each mean right and left sides when facing forward of the vehicle. A right-left direction will be also referred to as a vehicle width direction.

An outer panel 2 is at a front portion of the vehicle body 1. The outer panel 2 includes a bumper panel 21, right and left front fenders 22, and a hood 23. A front grill 24 is at the center of the bumper panel 21 in the vehicle width direction. The hood 23 opens or closes the front room 12. By opening of the hood 23, the front room 12 opens upward.

Figure 2:
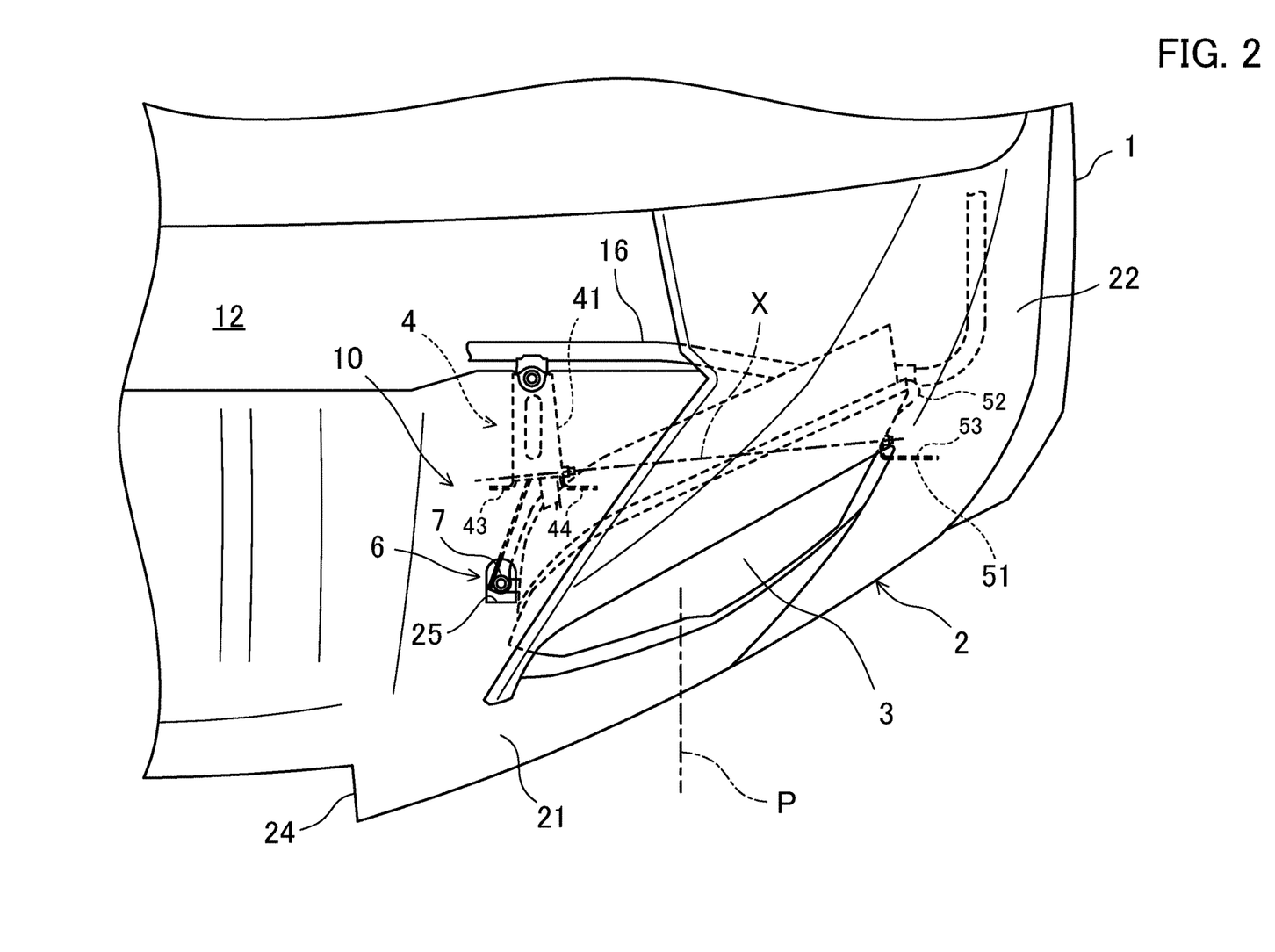
FIG. 2 is a plan view showing part of a front portion of a vehicle body in a state in which a hood is opened.

FIG. 2 is a plan view showing part of the front portion of the vehicle body 1 in a state in which the hood 23 is opened. The utility vehicle 100 includes an aiming mechanism 10 that adjusts the optical axis of a headlight 3. The aiming mechanism 10 includes the headlight 3, a supporter 4 that supports the headlight 3 on the vehicle body 1, and an adjuster 6 that adjusts the angle of the headlight 3. The utility vehicle 100 includes two right and left headlights 3 (see FIG. 1). The headlights 3 are located at both end portions of the bumper panel 21 in the vehicle width direction. The utility vehicle 100 includes the aiming mechanism 10 for each of the right and left headlights 3. The adjuster 6 adjusts the angle of the headlight 3, thereby adjusting the optical axis P of the headlight 3.

Figure 3:
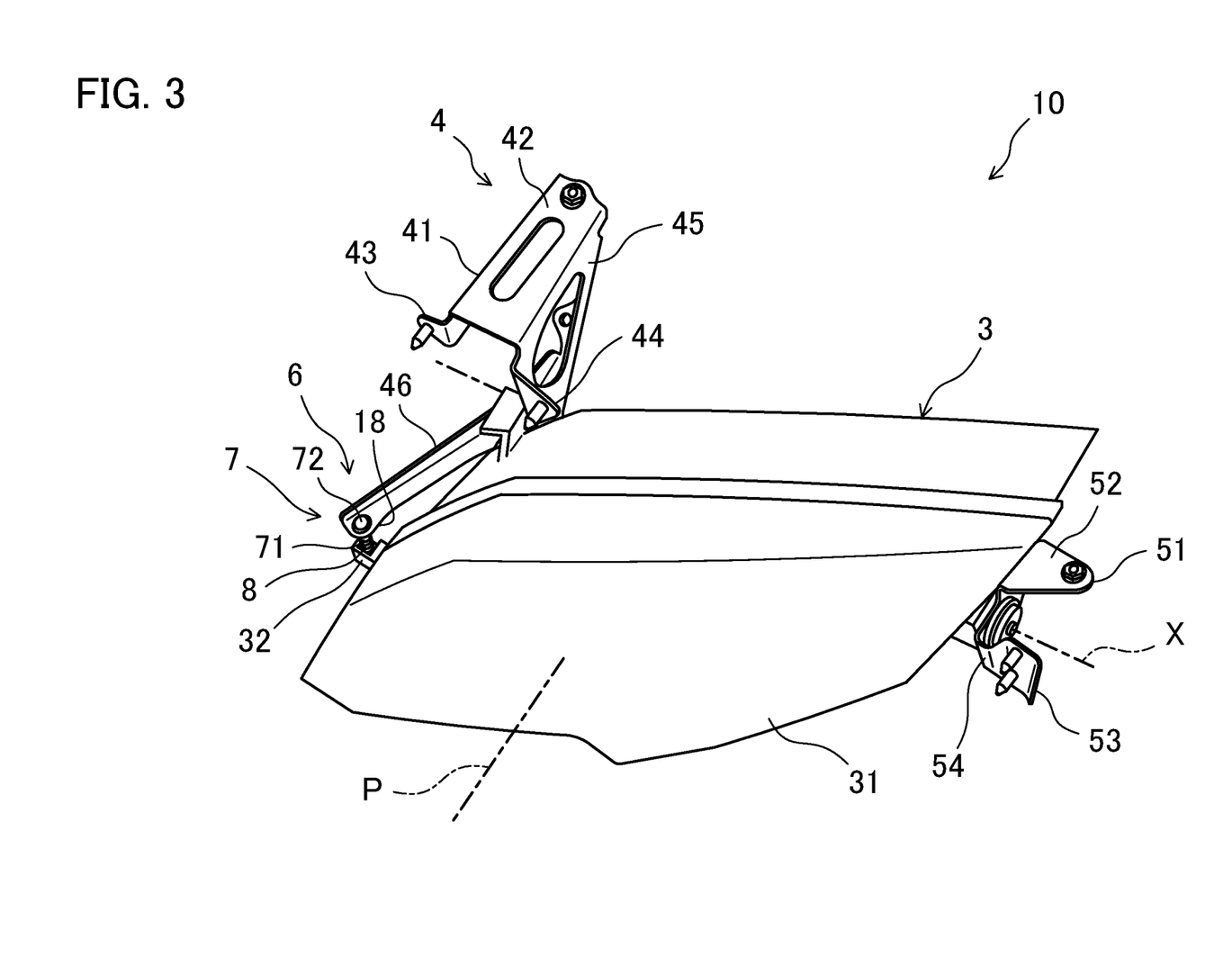
FIG. 3 is a perspective view of an aiming mechanism.
Figure 4:
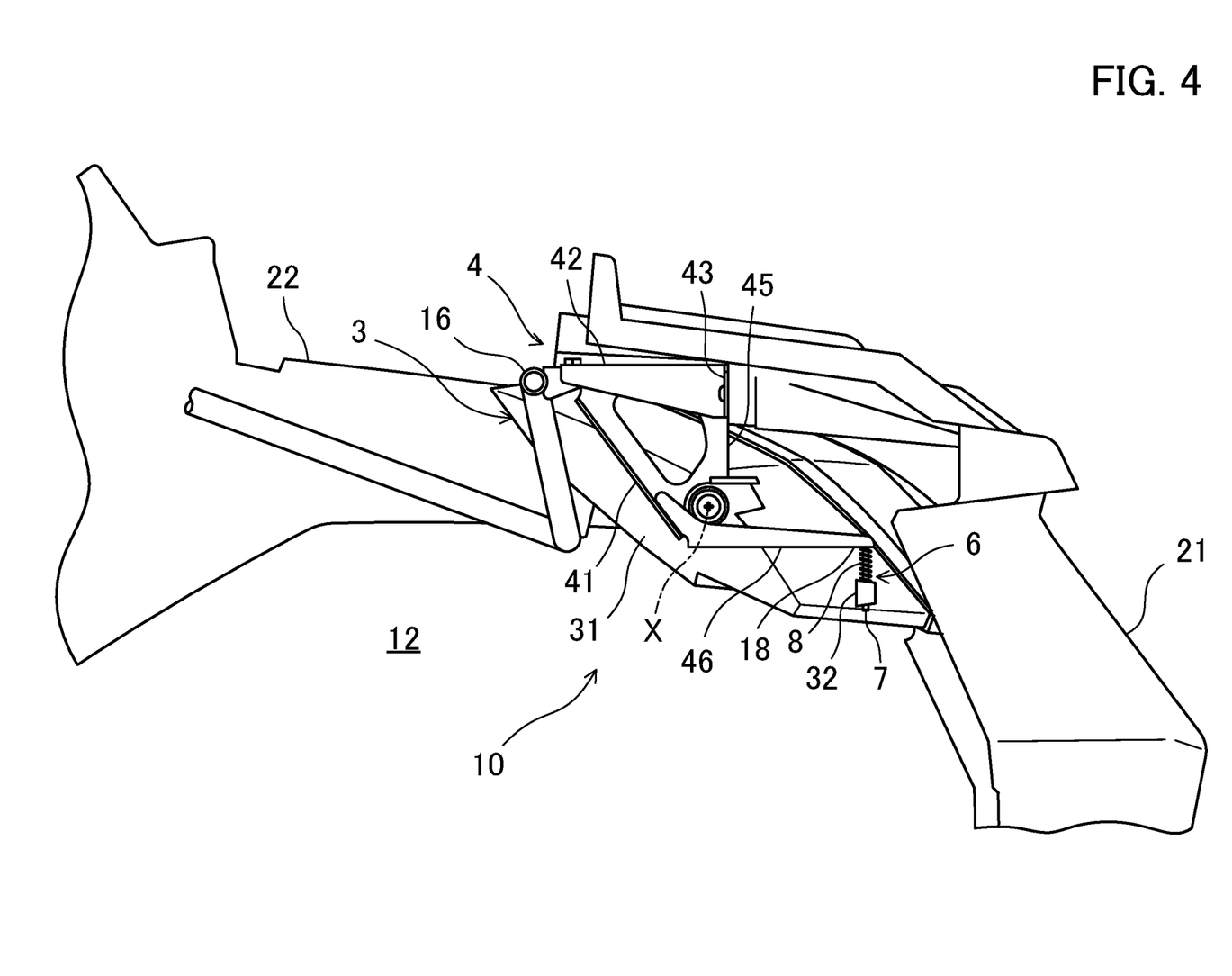
FIG. 4 is a side view of the aiming mechanism from an inner side in a vehicle width direction.

FIG. 3 is a perspective view of the aiming mechanism 10. FIG. 4 is a side view of the aiming mechanism 10 from the inner side in the vehicle width direction. The headlight 3 has a housing 31 that houses a light source, a lens, etc. At least a front portion of the housing 31 is transparent, and allows light to penetrate therethrough. The headlight 3 emits light in the direction of the predetermined optical axis P.

The supporter 4 supports the headlight 3 on the vehicle body 1 such that the headlight 3 is rotatable about a predetermined rotation axis X. The rotation axis X extends substantially horizontally, more specifically substantially in the vehicle width direction. Precisely, the rotation axis X is slightly inclined with respect to the vehicle width direction. The supporter 4 has a first support bracket 41 and a second support bracket 51. The first support bracket 41 and the second support bracket 51 are aligned substantially in the vehicle width direction. The first support bracket 41 is located on the inner side in the vehicle width direction, and the second support bracket 51 is located on the outer side in the vehicle width direction. The first support bracket 41 and the second support bracket 51 are fixed to the vehicle body 1. Specifically, the first support bracket 41 and the second support bracket 51 are, in the front room 12, fixed to the bumper panel 21 and a front frame 16. The front frame 16 is one of various frames in the front room 12. The front frame 16 is fixed to a main frame of the vehicle body 1.

As shown in FIGS. 2 and 3, the first support bracket 41 supports an inner portion of the headlight 3 in the vehicle width direction such that the inner portion is rotatable about the rotation axis X. The second support bracket 51 supports an outer portion of the headlight 3 in the vehicle width direction such that the outer portion is rotatable about the rotation axis X. Specifically, the first support bracket 41 and the second support bracket 51 support the housing 31.

Specifically, the first support bracket 41 has, as shown in FIGS. 3 and 4, a first attachment 42, a second attachment 43, a third attachment 44, a body 45, and a beam 46. The first attachment 42, the second attachment 43, the third attachment 44 are attached to the vehicle body 1. Thus, the first support bracket 41 is fixed to the vehicle body 1. Specifically, the first attachment 42 is attached to the front frame 16 in the front room 12. The second attachment 43 and the third attachment 44 are attached to the bumper panel 21. The body 45 supports the headlight 3. Specifically, the body 45 rotatably supports the housing 31 through a bearing or a bush. The beam 46 extends forward of the body 45.

The second support bracket 51 has, as shown in FIG. 3, a first attachment 52, a second attachment 53, and a body 54. The first attachment 52 and the second attachment 53 are attached to the vehicle body 1. Thus, the second support bracket 51 is fixed to the vehicle body 1. Specifically, the first attachment 52 is attached to the front frame 16 as shown in FIG. 2. The second attachment 53 is attached to the bumper panel 21. The body 54 supports the headlight 3. Specifically, the body 54 rotatably supports the housing 31 through a bearing or a bush.

The adjuster 6 adjusts the rotation angle of the headlight 3 about the rotation axis X. Hereinafter, unless otherwise specified, the "rotation angle" means a rotation angle about the rotation axis X. The adjuster 6 changes the distance of a mover 32 at the headlight 3 relative to a reference 18 at the vehicle body 1, thereby rotating the headlight 3 about the rotation axis X. The reference 18 and the mover 32 are on the inner side of the headlight 3 in the vehicle width direction.

As shown in FIG. 4, the reference 18 is on the inner side of the headlight 3 in the vehicle width direction. The reference 18 is, at the vehicle body 1, at a position eccentric from the rotation axis X. Specifically, the reference 18 is located at the front of the rotation axis X. The reference 18 is at the first support bracket 41. Specifically, a tip end portion of the beam 46 of the first support bracket 41 is the reference 18.

As shown in FIG. 4, the mover 32 is at an inner portion of the headlight 3 in the vehicle width direction. The mover 32 is, at the headlight 3, at a position eccentric from the rotation axis X. Specifically, the mover 32 is located at a position apart in a radial direction about the rotation axis X from a portion of the housing 31 rotatably supported by the first support bracket 41. The mover 32 is located below the reference 18. In this example, the mover 32 is integrated with the housing 31.

Figure 5:
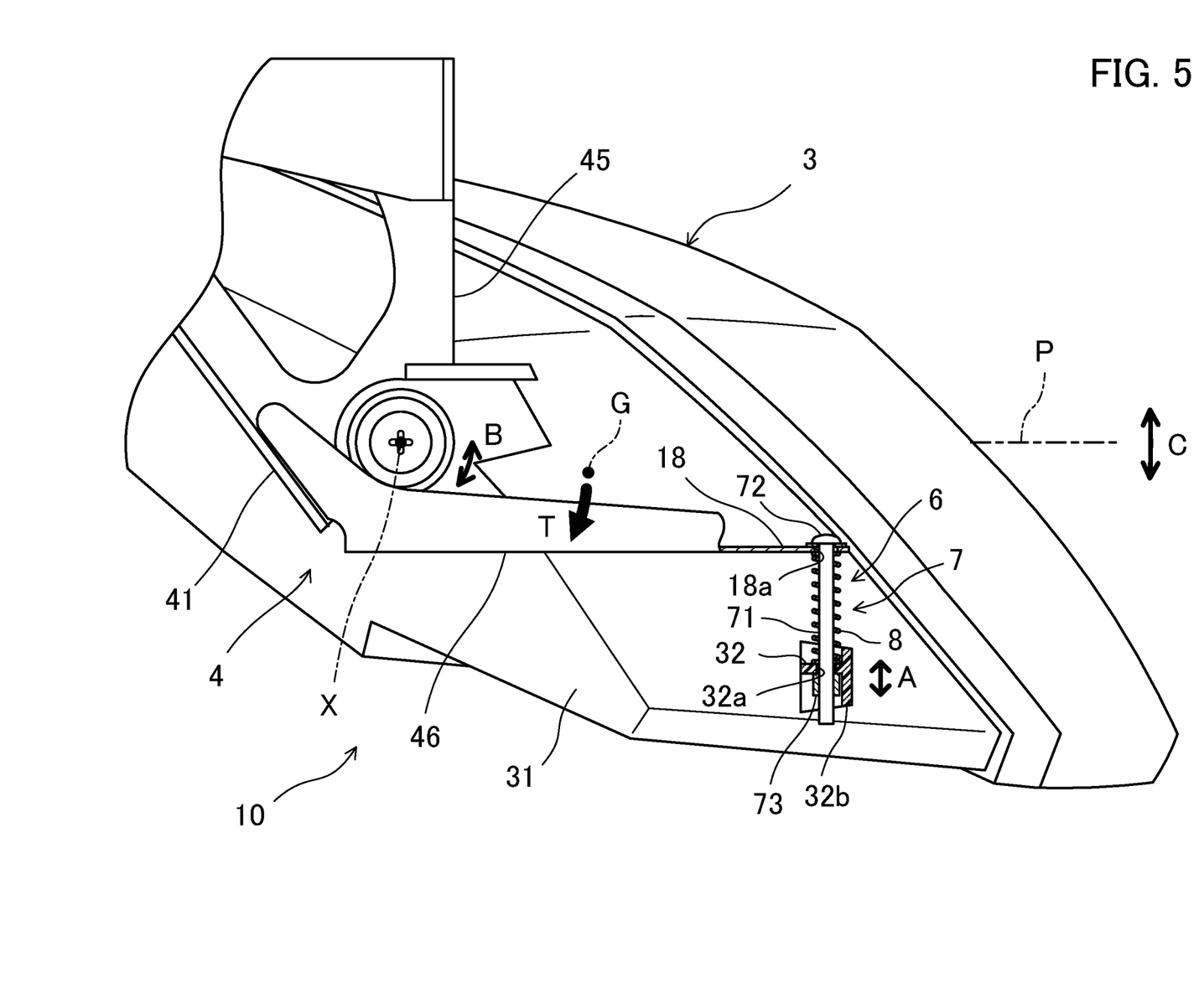
FIG. 5 is a partial side view of the aiming mechanism with an adjuster shown in section.

FIG. 5 is a partial side view of the aiming mechanism 10 with the adjuster 6 shown in section. The adjuster 6 has a screwing adjuster 7 that changes the distance of the mover 32 relative to the reference 18. The screwing adjuster 7 has a screw 71 engaging with the reference 18 and a nut 73 engaging with the mover 32 and screwed onto the screw 71. The screw 71 includes an external thread. The nut 73 includes an internal thread. The screw 71 is one example of a first fastening component, and the nut 73 is one example of a second fastening component. The screw 71 has a screw head 72.

A through-hole 18a penetrating the reference 18 up and down is at the reference 18. The through-hole 18a is able to be penetrated by the screw 71, and is smaller than the screw head 72. The screw 71 is inserted into the through-hole 18a from above. The screw head 72 of the screw 71 engages with the reference 18. The screw 71 extends downward of the reference 18 in a state in which the screw head 72 engages with the reference 18. That is, the screw 71 is hung from the reference 18.

A through-hole 32a penetrating the mover 32 up and down is at the mover 32. The through-hole 32a is positioned substantially below the through-hole 18a. The through-hole 32a is able to be penetrated by the screw 71, and is smaller than the nut 73. The nut 73 is placed below the mover 32. The screw 71 extending downward of the reference 18 is screwed into the nut 73 through the through-hole 32a. The mover 32 includes a detent 32b for the nut 73. With the detent 32b, the nut 73 screwed onto the screw 71 is unrotatable about the axis of the screw 71. In this manner, the nut 73 engages with the mover 32. Downward displacement of the mover 32 is limited by the nut 73 and therefore the screw 71.

In the above-described manner, the screwing adjuster 7, specifically the screw 71 and the nut 73, engages with the reference 18 and the mover 32 to define the limit of the distance of the mover 32 relative to the reference 18. That is, in an axial direction of the screw 71, the screw head 72, the reference 18, the mover 32, and the nut 73 are aligned in this order. The reference 18 and the mover 32 are located between the screw head 72 and the nut 73. The mover 32 is, between the screw head 72 and the nut 73, displaceable relative to the reference 18. An interval between the screw head 72 and the nut 73 is determined by the position of the nut 73 with respect to the screw 71. That is, the interval between the screw head 72 and the nut 73 defines the limit, i.e., the upper limit, of the distance of the mover 32 relative to the reference 18. Further, the screwing adjuster 7 changes the position of the nut 73 with respect to the screw 71, thereby changing the limit of the distance of the mover 32 relative to the reference 18.

As shown in FIG. 5, the adjuster 6 has a spring 8 that biases the mover 32 by elastic force, in addition to the screwing adjuster 7. The spring 8 is, for example, a coil spring. The spring 8 is one example of an elastic member. The spring 8 is located between the reference 18 and the mover 32, and biases the mover 32 in a direction of separating the mover 32 from the reference 18. Specifically, the spring 8 is, in a compressed state, located between the reference 18 and the mover 32. The spring 8 produces, in an alignment direction of the reference 18 and the mover 32, the elastic force in the direction of separating the mover 32 from the reference 18. Since the mover 32 is located below the reference 18, the spring 8 biases the mover 32 downward.

In this example, the screw 71 is inserted into the spring 8. Thus, the spring 8 is maintained between the reference 18 and the mover 32.

The mover 32 is pressed against the nut 73 by the spring 8. Since the nut 73 is screwed onto the screw 71, the screw head 72 is pressed against the reference 18. As a result, a state in which the mover 32 contacts the nut 73 and the reference 18 contacts the screw head 72, i.e., a state in which the mover 32 is separated from the reference 18 to the maximum extent, is brought.

By cooperation of the screwing adjuster 7 and the spring 8, the adjuster 6 changes the distance of the mover 32 relative to the reference 18. That is, the interval between the screw head 72 and the nut 73 in the screwing adjuster 7 defines the upper limit of the distance of the mover 32 relative to the reference 18. The spring 8 causes the mover 32 to contact the nut 73 and causes the reference 18 to contact the screw head 72, thereby extending the distance of the mover 32 relative to the reference 18 to the maximum extent. The position of the nut 73 relative to the screw 71 is adjusted, and accordingly, the interval between the screw head 72 and the nut 73, i.e., the upper limit of the distance of the mover 32 relative to the reference 18, is adjusted. The mover 32 is displaced relative to the reference 18 by the spring 8 such that the relative distance between the reference 18 and the mover 32 reaches the upper limit after adjustment. In this manner, the screwing adjuster 7 defines the limit of displacement of the mover 32 by the elastic force of the spring 8 and changes such a limit, thereby changing the distance of the mover 32 relative to the reference 18.

As shown in FIG. 5, after the distance of the mover 32 relative to the reference 18 has changed (see an arrow A), the rotation angle of the headlight 3 changes (see an arrow B). Then, after the rotation angle of the headlight 3 has changed, the direction of the optical axis P of the headlight 3 changes (see an arrow C). That is, the adjuster 6 adjusts the rotation angle of the headlight 3, and as a result, adjusts the direction of the optical axis P of the headlight 3. Since the optical axis P is oriented substantially forward and the rotation axis X extends substantially in the horizontal direction, the direction of the optical axis P is adjusted in the up-down direction.

In addition, the screwing adjuster 7 limits displacement of the mover 32 in the same direction as that of a torque (hereinafter referred to as a "self-weight torque") T about the rotation axis X due to the weight of the headlight 3 itself. The spring 8 biases the mover 32 in the same direction as that of the self-weight torque T.

Specifically, the supporter 4 rotatably supports the headlight 3 such that the self-weight torque T is generated. That is, the supporter 4 supports the headlight 3 such that the center G of gravity of the headlight 3 and the rotation axis X are different from each other in a position in the horizontal direction. Note that the positions of the center G of gravity and the rotation axis X in the vertical direction may be coincident with each other or different from each other. That is, the center G of gravity is located at a position shifted from the rotation axis X, a region right above the rotation axis X, and a region right below the rotation axis X. By such support, the self-weight torque T is generated in a direction of moving the center G of gravity downward.

In the example of FIG. 5, the supporter 4 supports a relatively-rear portion of the headlight 3. The center G of gravity of the headlight 3 is located at the front of the rotation axis X. As a result, the self-weight torque T moving a front portion of the headlight 3 downward, i.e., the clockwise self-weight torque T as viewed in FIG. 5, is generated. The direction of the self-weight torque T is equivalent to the direction of separating the mover 32 from the reference 18, i.e., a direction of biasing the mover 32 by the spring 8. That is, the spring 8 biases the mover 32 in the same direction as that of the self-weight torque T. Thus, the self-weight torque T is received by engagement between the screw 71 and the reference 18 and engagement between the nut 73 and the mover 32.

For example, in a case where the vehicle body 1 vibrates while the utility vehicle 100 is running, such vibration is also transmitted to the headlight 3. The headlight 3 might vibrate about the rotation axis X. Rotational displacement of the headlight 3 about the rotation axis X is restricted by the screwing adjuster 7 and the spring 8. The spring 8 is elastically deformed, and on the other hand, the positions of the screw 71 and the nut 73 in the screwing adjuster 7 are fixed. Thus, the headlight 3 can be rotatably displaced in the direction restricted by the spring 8, but cannot be rotatably displaced in the direction restricted by the screwing adjuster 7. In this example, the headlight 3 can be rotatably displaced in a direction of causing the mover 32 to approach the reference 18, but cannot be rotatably displaced in the direction of separating the mover 32 from the reference 18.

In vibration of the headlight 3, the self-weight torque T is added to impact of such vibration in the same direction as that of the self-weight torque T, and therefore, greater impact is generated as compared to the direction opposite to that of the self-weight torque T. In this example, the impact in the same direction as that of the self-weight torque T in vibration of the headlight 3 is not received by the spring 8, but is received by the screw 71 and the nut 73 in the screwing adjuster 7. Thus, vibration of the headlight 3 can be reduced as compared to a case where the impact in the same direction as that of the self-weight torque T is received by the spring 8.

In other words, not impact on the headlight 3 in the same direction as that of the self-weight torque T but impact on the headlight 3 in the direction opposite to that of the self-weight torque T acts on the spring 8. Thus, displacement and vibration of the headlight 3 due to elastic deformation of the spring 8 can be reduced.

Figure 6:
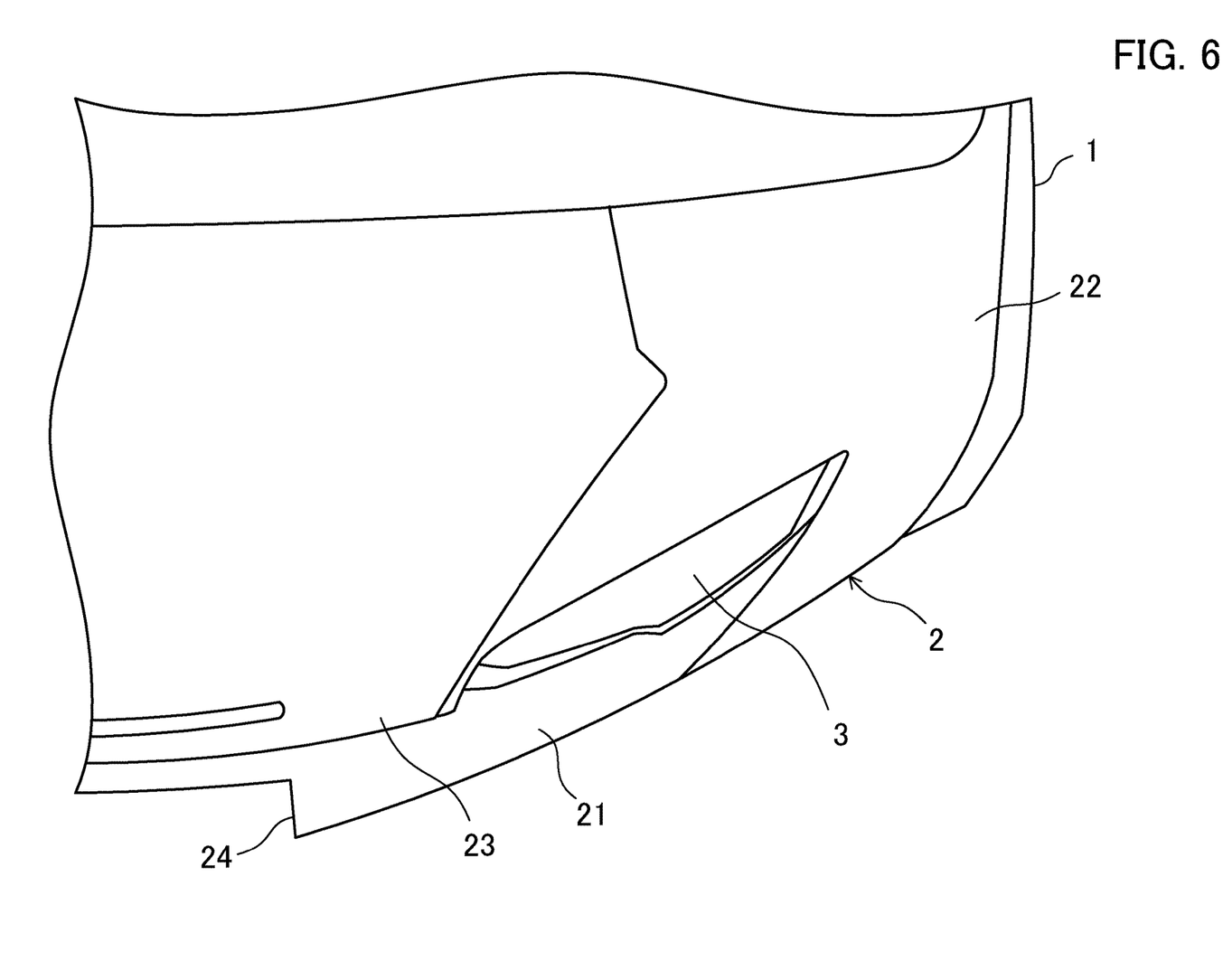
FIG. 6 is a plan view showing part of the front portion of the vehicle body in a state in which the hood is closed.

Next, location of the adjuster 6 will be described. The adjuster 6 is located accessible from above the vehicle body 1. The term "accessible" described herein means that a tool or a hand of an operator can reach an intended location. Specifically, the adjuster 6 is located in the front room 12. FIG. 6 is a plan view showing part of the front portion of the vehicle body 1 in a state in which the hood 23 is closed. The front room 12 is closed with the hood 23. In the state in which the hood 23 is closed, the adjuster 6 is covered with the hood 23, and is not exposed to the outside. On the other hand, in the state in which the hood 23 is opened, the adjuster 6 is accessible from above the vehicle body 1, as shown in FIG. 2. Specifically, the screwing adjuster 7 of the adjuster 6 to be operated by the operator, more specifically the screw head 72, is located accessible from above the vehicle body 1.

Specifically, the adjuster 6 is located such that the adjuster 6 and the headlight 3 are aligned in the vehicle width direction, as shown in FIG. 2. Specifically, the reference 18 is at the first support bracket 41. The first support bracket 41 supports the inner portion of the headlight 3 in the vehicle width direction. The reference 18 is located such that the reference 18 and the headlight 3 are aligned in the vehicle width direction, and more specifically, is located on the inner side in the vehicle width direction with respect to the headlight 3. Since the adjuster 6 is at the reference 18, the adjuster 6 is also located such that the adjuster 6 and the headlight 3 are aligned in the vehicle width direction, and more specifically, is located on the inner side in the vehicle width direction with respect to the headlight 3. That is, the adjuster 6 is located at a position not overlapping with the headlight 3 in the up-down direction.

Note that the headlight 3 and the adjuster 6 are, in the front room 12, located below the bumper panel 21 and the front fender 22. That is, the headlight 3 and the adjuster 6 are, on the upper side thereof, covered with the bumper panel 21 and the front fender 22. Thus, an access opening 25 is at the panel positioned above the adjuster 6. In this example, the access opening 25 is at a portion of the bumper panel 21 positioned above the adjuster 6.

The adjuster 6 is accessible through the access opening 25. At least the screwing adjuster 7 of the adjuster 6 is accessible through the access opening 25. Specifically, in the adjuster 6, the screw head 72 of the screw 71 is located on the uppermost side. The screw head 72 is, in the screwing adjuster 7, an operation portion to be operated by the operator. The screw head 72 is accessible from the outside of the vehicle through the access opening 25. For example, the operator inserts the tool into the access opening 25 from the outside of the vehicle until the tool reaches the screw head 72. In this state, the operator rotatably operates the screw 71 by the tool. That is, the adjuster 6 is operable through the access opening 25. In this manner, the position of the nut 73 relative to the screw 71 is changed, and the rotation angle of the headlight 3, i.e., the direction of the optical axis P, is changed.

In the utility vehicle 100 configured as described above, the adjuster 6 is located accessible from above the vehicle body 1, and therefore, exposure of the adjuster 6 from a front surface of the vehicle body 1 is prevented. The front surface of the vehicle body 1 has great influence on the design of the utility vehicle 100. The adjuster 6 is not exposed from the front surface of the vehicle body 1, and therefore, degradation of the design of the utility vehicle 100 can be prevented. Moreover, the front portion of the vehicle body 1 is, on the upper side thereof, normally covered with the hood 23. The adjuster 6 is located so as to be covered with the hood 23, and therefore, can be hidden from the outside by the hood 23 in the closed state. The adjuster 6 is exposed to above the vehicle body 1 by opening of the hood 23, and therefore, becomes accessible. The hood 23 can be easily opened or closed, and therefore, the adjuster 6 can be easily brought into an accessible state.

The adjuster 6 adjusts the rotation angle of the headlight 3 by interaction of limitation of displacement of the mover 32 by the screwing adjuster 7 and biasing of the mover 32 by the spring 8. That is, only by operation of the screwing adjuster 7, the direction of the optical axis P of the headlight 3 can be adjusted. At least the screwing adjuster 7 of the adjuster 6 is accessible from above the vehicle body 1, and therefore, the adjuster 6 can be operated. That is, the screwing adjuster 7 and the spring 8 are employed so that limitations on location of the adjuster 6 can be reduced and the degree of freedom in location of the adjuster 6 can be improved.

In addition, the spring 8 biases the mover 32 in the same direction as that of the self-weight torque T of the headlight 3, and the screwing adjuster 7 limits displacement of the mover 32 in the same direction as that of the self-weight torque T. The self-weight torque T is not supported by the spring 8, but is supported by the screwing adjuster 7. Thus, even when the headlight 3 vibrates, for example, while the utility vehicle 100 is running, vibration of the headlight 3 can be reduced.

The mover 32 is located below the reference 18, the spring 8 biases the mover 32 downward, the screw head 72 of the screw 71 engages with the reference 18, and the nut 73 engages with the mover 32. Thus, downward displacement of the mover 32 relative to the reference 18 is limited so that the screw head 72 can be located accessible from above and the self-weight torque T can be supported by the screwing adjuster 7. That is, such a configuration is employed so that both access from above the vehicle body 1 and reduction in vibration of the headlight 3 can be realized.

The aiming mechanism 10 employs an outer aiming method of adjusting the rotation angle of the housing 31 instead of adjusting a component in the housing 31. That is, the supporter 4 and the adjuster 6 can be located outside the housing 31. A space can be more easily ensured outside the housing 31 than inside the housing 31. Thus, it is not necessary to decrease the supporter 4 and the adjuster 6 in size and complicate the supporter 4 and the adjuster 6. Moreover, the strength of the supporter 4 can be easily ensured. That is, the aiming mechanism 10 is suitable for the off-road vehicle.

As described above, the aiming mechanism 10 includes the headlight 3, the supporter 4 that supports the headlight 3 on the vehicle body 1 such that the headlight 3 is rotatable about the predetermined rotation axis X, and the adjuster 6 that adjusts the rotation angle of the headlight 3. The adjuster 6 is located accessible from above the vehicle body 1.

The utility vehicle 100 includes the vehicle body 1 and the aiming mechanisms 10.

According to these configurations, the adjuster 6 is accessible from above the vehicle body 1, and therefore, the design of the utility vehicle 100 can be ensured without the need for exposing the adjuster 6 from the front surface of the vehicle body 1. Moreover, a headlight cover etc. are not above the headlight 3, and therefore, it is not necessary to detach the headlight cover etc. for operating the adjuster 6. As a result, workability in optical axis adjustment can be improved.

The hood 23 is at the vehicle body 1, and the adjuster 6 is covered with the hood 23 in the closed state and is accessible from above the vehicle body 1 in the state in which the hood 23 is opened.

According to this configuration, the adjuster 6 is, by closing of the hood 23, covered with the hood 23 so as not to be exposed. Thus, the design of the utility vehicle 100 can be more easily ensured. On the other hand, it is necessary to open the hood 23 for accessing the adjuster 6. However, the hood 23 is normally easily opened or closed, and therefore, the workability in optical axis adjustment is not degraded.

The adjuster 6 is located such that the adjuster 6 and the headlight 3 are aligned in the vehicle width direction.

According to this configuration, the adjuster 6 does not overlap with the headlight 3 in the up-down direction, and therefore, is easily accessible from above.

The adjuster 6 has the screwing adjuster 7 that changes the distance of the mover 32 at the position eccentric from the rotation axis X at the headlight 3 relative to the reference 18 at the vehicle body 1, and the screwing adjuster 7 is located accessible from above the vehicle body 1.

According to this configuration, the mover 32 is at the position eccentric from the rotation axis X, and therefore, linear displacement of the mover 32 relative to the reference 18 by the screwing adjuster 7 is converted into rotation of the headlight 3 about the rotation axis X. That is, the rotation angle of the headlight 3 can be changed by the screwing adjuster 7 with a relatively-simple configuration. Moreover, the screwing adjuster 7 is located accessible from above the vehicle body 1, and therefore, the adjuster 6 located accessible from above the vehicle body 1 can be easily realized.

The adjuster 6 further includes the spring 8 (the elastic member) that biases, by the elastic force, the mover 32 in the direction of causing the mover 32 to approach the reference 18 or the direction of separating the mover 32 from the reference 18, and the screwing adjuster 7 limits displacement of the mover 32 by the elastic force of the spring 8 to adjust the distance of the mover 32 relative to the reference 18.

According to this configuration, the screwing adjuster 7 limits displacement of the mover 32 by the elastic force of the spring 8, and therefore, the mover 32 displaces to the limit set by the screwing adjuster 7 by the elastic force of the spring 8. Thus, the limit of displacement of the mover 32 by the screwing adjuster 7 is changed, and accordingly, the mover 32 displaces. In this manner, the distance of the mover 32 relative to the reference 18 is adjusted by interaction of the screwing adjuster 7 and the spring 8.

The spring 8 biases the mover 32 in the same direction as that of the torque about the rotation axis X due to the weight of the headlight 3 itself, i.e., the self-weight torque T, and the screwing adjuster 7 limits displacement of the mover 32 in the same direction as that of the self-weight torque T.

According to this configuration, the self-weight torque T is supported not by the spring 8 but by the screwing adjuster 7. In a case where the headlight 3 vibrates about the rotation axis X, the impact of the self-weight torque T is added to impact derived from such vibration in the same direction as that of the self-weight torque T. On the other hand, in the direction opposite to that of the self-weight torque T, the self-weight torque T acts to reduce the impact derived from vibration. The impact in the same direction as that of the self-weight torque T is supported by the screwing adjuster 7, and the impact in the direction opposite to that of the self-weight torque T is supported by the spring 8. Thus, vibration of the headlight 3 can be reduced.

Specifically, the screwing adjuster 7 has the screw 71 (the first fastening component) engaging with the reference 18 and the nut 73 (the second fastening component) engaging with the mover 32 and screwed onto the screw 71, the spring 8 is located between the reference 18 and the mover 32 and biases the mover 32 in the direction of separating the mover 32 from the reference 18, and the screw 71 and the nut 73 define the upper limit of the distance of the mover 32 relative to the reference 18.

According to this configuration, the spring 8 extends an interval between the reference 18 and the mover 32, and on the other hand, the screwing adjuster 7 limits the upper limit of the interval between the reference 18 and the mover 32. The screwing adjuster 7 is configured such that the nut 73 is displaceable in each of the same direction as that of the elastic force of the spring 8 and the direction opposite to that of the elastic force of the spring 8. In a case where the nut 73 displaces in the same direction as that of the elastic force of the spring 8, the upper limit of the interval between the reference 18 and the mover 32 is changed to a greater interval, and the mover 32 is moved in the direction of separating the mover 32 from the reference 18 by the elastic force of the spring 8. Accordingly, engagement between the mover 32 and the nut 73 is maintained. As a result, the distance of the mover 32 relative to the reference 18 increases. On the other hand, in a case where the nut 73 displaces in the direction opposite to that of the elastic force of the spring 8, the upper limit of the interval between the reference 18 and the mover 32 is changed to a smaller interval, and the mover 32 displaces together with the nut 73 against the elastic force of the spring 8. As a result, the distance of the mover 32 relative to the reference 18 decreases. In this manner, the distance of the mover 32 relative to the reference 18 is changed by the interaction of the screwing adjuster 7 and the spring 8.

Other Embodiments

The embodiment has been described above as an example of the technique disclosed in the present application. However, the technique in the present disclosure is not limited to above, and is also applicable to embodiments to which changes, replacements, additions, omissions, etc. are made as necessary. The components described above in the embodiment may be combined to form a new embodiment. The components shown in the attached drawings and described in detail may include not only components essential for solving the problems, but also components that are provided for describing an example of the above-described technique and are not essential for solving the problems. Thus, description of these non-essential components in detail and illustration of these components in the attached drawings shall not be interpreted that these non-essential components are essential.

For example, the off-road vehicle to which the aiming mechanism 10 is applied is not limited to the utility vehicle 100. The off-road vehicle may be, for example, an all terrain vehicle (ATV) or a tractor. Moreover, the off-road vehicle is not limited to the four-wheeled vehicle, and for example, may be a two-wheeled vehicle.

The adjuster 6 is not necessarily covered with the hood 23 in the closed state as long as the adjuster 6 is accessible from above the vehicle body 1. For example, the access opening 25 may be at a portion, which is not covered with the hood 23, of an upper surface of the outer panel 2, such as the bumper panel 21 or the front fender 22. In this case, the access opening 25 may or may not include a closing member that closes the access opening 25, such as a cap. The size of the access opening 25 may only be required to be such a size that the adjuster 6 is accessible, and therefore, may be relatively small. Thus, even in a case where the access opening 25 is at the portion not covered with the hood 23, the design is not greatly degraded. Particularly, the access opening 25 is closed with, e.g., the cap so that the design can be easily ensured.

The configuration of the adjuster 6 is not limited to the above-described configuration. Considering improvement in the workability in optical axis adjustment, ensuring of the design of the vehicle, and reduction in vibration, at a position at which the self-weight torque T acts substantially upward (e.g., a position at the rear of the rotation axis X in FIG. 5), the mover 32 may be located above the reference 18, the spring 8 in the compressed state may bias the mover 32 in the direction of separating the mover 32 from the reference 18, the screw 71 may engage with the mover 32, and the nut 73 may engage the reference 18. In this case, the screw 71 and the nut 73 engage with the mover 32 and the reference 18 so as to define the upper limit of the distance of the mover 32 relative to the reference 18, i.e., limit displacement of the mover 32 in the direction of separating the mover 32 from the reference 18. According to this configuration, the screw head 72 is located so as to face upward at an upper portion of the adjuster 6, and the screwing adjuster 7 supports the self-weight torque T.

Alternatively, at a position at which the self-weight torque T acts substantially downward (e.g., a position at the front of the rotation axis X in FIG. 5), the mover 32 may be located above the reference 18, the spring 8 in an extended state may bias the mover 32 in the direction of causing the mover 32 to approach the reference 18, the screw 71 may engage with the mover 32, and the nut 73 may engage with the reference 18. In this case, the screw 71 and the nut 73 engage with the mover 32 and the reference 18 so as to define the lower limit of the distance of the mover 32 relative to the reference 18, i.e., limit displacement of the mover 32 in the direction of causing the mover 32 to approach the reference 18. According to this configuration, the screw head 72 is located so as to face upward at the upper portion of the adjuster 6, and the screwing adjuster 7 supports the self-weight torque T.

Alternatively, at the position at which the self-weight torque T acts substantially upward, the mover 32 may be located below the reference 18, the spring 8 in the extended state may bias the mover 32 in the direction of causing the mover 32 to approach the reference 18, the screw 71 may engage with the reference 18, and the nut 73 may engage with the mover 32. In this case, the screw 71 and the nut 73 engage with the reference 18 and the mover 32 so as to limit displacement of the mover 32 in the direction of causing the mover 32 to approach the reference 18. According to this configuration, the screw head 72 is located so as to face upward at the upper portion of the adjuster 6, and the screwing adjuster 7 supports the self-weight torque T.

Considering improvement in the workability in optical axis adjustment and ensuring of the design of the vehicle, the self-weight torque T may be supported not by the screwing adjuster 7 but by the spring 8 in the adjuster 6. For example, at the position at which the self-weight torque T acts substantially downward, the mover 32 may be located above the reference 18, the spring 8 in the compressed state may bias the mover 32 in the direction of separating the mover 32 from the reference 18, the screw 71 may engage with the mover 32, and the nut 73 may engage with the reference 18. The screw 71 and the nut 73 engage the mover 32 and the reference 18 so as to limit displacement of the mover 32 in the direction of separating the mover 32 from the reference 18. According to this configuration, the screw head 72 is located so as to face upward at the upper portion of the adjuster 6, and the spring 8 supports the self-weight torque T.

Alternatively, at the position at which the self-weight torque T acts substantially downward, the mover 32 may be located below the reference 18, the spring 8 in the extended state may bias the mover 32 in the direction of causing the mover 32 to approach the reference 18, the screw 71 may engage with the reference 18, and the nut 73 may engage with the mover 32. The screw 71 and the nut 73 engage with the reference 18 and the mover 32 so as to limit displacement of the mover 32 in the direction of causing the mover 32 to approach the reference 18. According to this configuration, the screw head 72 is located so as to face upward at the upper portion of the adjuster 6, and the spring 8 supports the self-weight torque T.

Alternatively, at the position at which the self-weight torque T acts substantially upward, the mover 32 may be located below the reference 18, the spring 8 in the compressed state may bias the mover 32 in the direction of separating the mover 32 from the reference 18, the screw 71 may engage with the reference 18, and the nut 73 may engage with the mover 32. The screw 71 and the nut 73 engage with the reference 18 and the mover 32 so as to limit displacement of the mover 32 in the direction of separating the mover 32 from the reference 18. According to this configuration, the screw head 72 is located so as to face upward at the upper portion of the adjuster 6, and the spring 8 supports the self-weight torque T.

Alternatively, at the position at which the self-weight torque T acts substantially upward, the mover 32 may be located above the reference 18, the spring 8 in the extended state may bias the mover 32 in the direction of causing the mover 32 to approach the reference 18, the screw 71 may engage with the mover 32, and the nut 73 may engage with the reference 18. The screw 71 and the nut 73 engage with the mover 32 and the reference 18 so as to limit displacement of the mover 32 in the direction of causing the mover 32 to approach the reference 18. According to this configuration, the screw head 72 is located so as to face upward at the upper portion of the adjuster 6, and the spring 8 supports the self-weight torque T.

The elastic member biasing the mover 32 is not limited to the spring, and may be rubber. In a case where the elastic member is the spring, the spring may be, for example, a helical torsion spring or a plate spring.

The configuration of the supporter 4 is not limited to the above-described configuration. The shapes of the first support bracket 41 and the second support bracket 51 may be set as necessary. For the supporter 4, support with the brackets is not necessarily employed. The first support bracket 41 and the second support bracket 51 may only be required to be fixed to the vehicle body 1, and may be fixed to portions of the vehicle body 1 other than the bumper panel 21 and the front frame 16.

Location of the adjuster 6 is not limited to the position on the inner side in the vehicle width direction with respect to the headlight 3. The adjuster 6 may be located on the outer side in the vehicle width direction with respect to the headlight 3. Alternatively, the adjuster 6 may be located at the rear of the headlight 3.

What is claimed:

1. An off-road vehicle comprising:
a vehicle body; and
a headlight aiming mechanism, wherein
the headlight aiming mechanism comprises:
a headlight;
a supporter that supports the headlight on the vehicle body such that the headlight is rotatable about a predetermined rotation axis; and
an adjuster that adjusts a rotation angle of the headlight about the rotation axis,
the adjuster is located accessible from above the vehicle body and changes a substantially up-down distance of a mover at a position eccentric from the rotation axis at the headlight relative to a reference at the vehicle body.

2. The off-road vehicle of claim 1, wherein
a hood is at the vehicle body, and
the adjuster is covered with the hood in a closed state, and is accessible from above the vehicle body in a state in which the hood is opened.

3. The off-road vehicle of claim 1, wherein
the adjuster is located such that the adjuster and the headlight are aligned in a vehicle width direction.

4. The off-road vehicle of claim 1, wherein
the adjuster has a screwing adjuster that changes the substantially up-down distance of the mover relative to the reference, and
the screwing adjuster is located accessible from above the vehicle body.

5. An off-road vehicle comprising:
a vehicle body; and
a headlight aiming mechanism, wherein
the headlight aiming mechanism comprises:
a headlight;

a supporter that supports the headlight on the vehicle body such that the headlight is rotatable about a predetermined rotation axis; and an adjuster that adjusts a rotation angle of the headlight about the rotation axis, the adjuster includes a screwing adjuster that changes a distance of a mover at a position eccentric from the rotation axis at the headlight relative to a reference at the vehicle body and an elastic member that biases the mover in a direction of causing the mover to approach the reference or a direction of separating the mover from the reference, and the screwing adjuster is located accessible from above the vehicle body and limits displacement of the mover by elastic force of the elastic member to adjust the distance of the mover relative to the reference.

6. The off-road vehicle of claim 5, wherein
the elastic member biases the mover in a direction identical to that of a torque about the rotation axis due to a weight of the headlight itself, and
the screwing adjuster limits displacement of the mover in the direction identical to that of the torque.

7. The off-road vehicle of claim 6, wherein
the screwing adjuster has a first fastening component engaging with the reference and a second fastening component engaging with the mover and screwed to the first fastening component,
the elastic member is located between the reference and the mover, and biases the mover in the direction of separating the mover from the reference, and
the first fastening component and the second fastening component define an upper limit of the distance of the mover relative to the reference.

\* \* \* \* \*